United States Patent [19]

Herzog

[11] 3,816,712

[45] June 11, 1974

[54] METHOD AND APPARATUS FOR DETECTING RELATIVE DEVIATIONS IN POSITION OF TWO PARTS MOVED IN A PREDETERMINED DESIRED RELATIONSHIP

[75] Inventor: Klaus Herzog, Heidenheim (Brenz), Germany

[73] Assignee: Carl Zeiss-Stiftung d/b/a Carl Zeiss, Oberkochen, Germany

[22] Filed: Nov. 13, 1972

[21] Appl. No.: 305,674

[30] Foreign Application Priority Data
Nov. 29, 1971 Germany.............................. 2159002

[52] U.S. Cl. .... 235/92 MP, 235/92 FQ, 235/92 PS, 235/92 R
[51] Int. Cl. ........................................... H03k 21/30
[58] Field of Search........ 235/92 PS, 92 MP, 92 PB, 235/92 TF, 92 CV, 92 FQ, 92 EC

[56] References Cited
UNITED STATES PATENTS
3,178,562  4/1965  Acker et al. .................... 235/92 MP
3,564,219  2/1971  Mutziger ......................... 235/92 TF Primary Examiner—Paul J. Henon
Assistant Examiner—Joseph M. Thesz, Jr.
Attorney, Agent, or Firm—Sandoe, Hopgood & Calimafde

[57] ABSTRACT

The invention contemplates measurement of displacement deviations between two relatively movable parts, using movement of the respective parts to generate first and second primary-pulse trains, wherein the pulses of the first train determine gate-opening functions and the pulses of the second train determine gate-closing functions. A finely divided secondary-pulse train is also generated by movement of one of the parts, and the gate determines the number of secondary pulses passed to a counter, for a direct indication of the instantaneous deviation in relative position of the parts.

11 Claims, 1 Drawing Figure

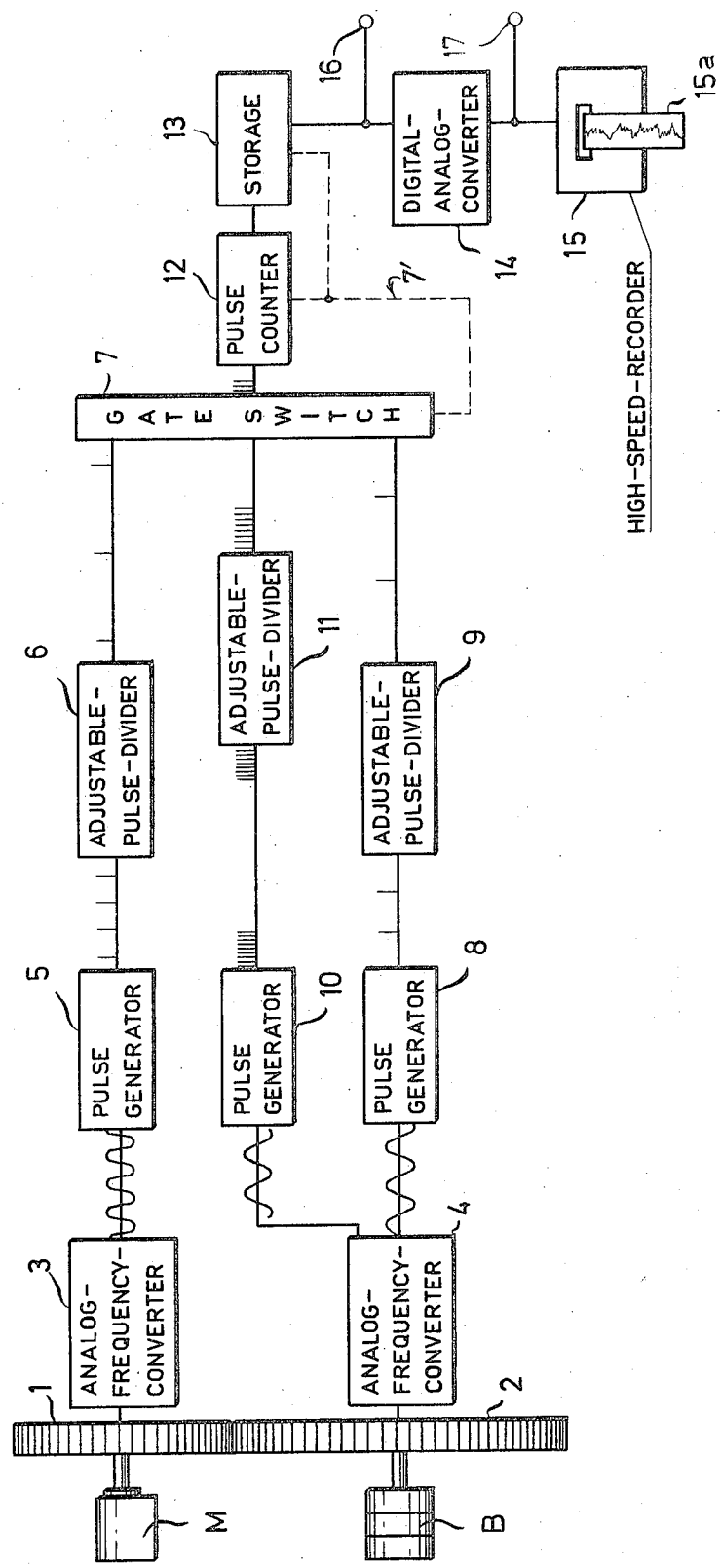

METHOD AND APPARATUS FOR DETECTING RELATIVE DEVIATIONS IN POSITION OF TWO PARTS MOVED IN A PREDETERMINED DESIRED RELATIONSHIP

The present invention relates to a method and apparatus for detecting relative deviations in position of two parts moved in a predetermined desired relationship, using movements of the respective two parts to produce separate trains of primary electric signals via suitable generator systems.

According to an existing technique, the position of parts which move relatively to each other is determined by comparing pulse frequencies independently generated by the respective movements of the parts, using pulse dividers and/or multipliers to facilitate the comparison. Deviations between the compared pulse trains are used to generate a voltage which, in turn, is fed to a recorder, for recording the relative error. For frequency multiplication in such technique, a device is used consisting of a controlled oscillator and a frequency divider, the divided frequency being compared with the signal frequency, to produce a control voltage for control of the oscillator.

The object of the present invention is to increase the power of discrimination and the precision of measurement as compared with the known devices; at the same time, it is an object to keep the technical complexity and cost as small as possible, and to avoid the hitherto degrading effects of time or speed-dependence.

This result is achieved in accordance with the present invention with a method and apparatus of the aforementioned type by using primary-signal pulse trains to open and close a gated pulse counter, the gated pulses being obtained by time-independent production of a plurality of secondary pulses from the individual primary-signal pulse periods. Thus, the counted secondary pulses precisely and accurately measure any deviations in relative position of the movable parts.

In this counted situation, the relative deviations in position are measured purely digitally in length or angle values.

By an additional adjustable pulse division of the position-accurate secondary-pulse train fed into the pulse counter, the power of discrimination of the measuring process can be varied in a simple fashion.

Other objects and various further features of novelty and invention will be pointed out or will occur to those skilled in the art from a reading of the following specification, in conjunction with the accompanying drawing which is a schematic diagram to illustrate a gear-testing application of the method of the invention.

In the gear-testing instrument shown, the test gearing consists, for instance, of two meshing gears 1 and 2. The gear 1 has a number of teeth $z_1$ and the gear 2 has a number of teeth $z_2$.

Let it be assumed that gear 1 is driven, for instance, by a drive motor M, while the gear 2 is braked by means of a braking device B in order to insure constant and consistent tooth contact, without backlash. Both gear wheels are connected with rotary signal-generator systems 3, 4 of known construction which convert the rotary movements of the gears into electric primary-signal sequences. The rotary generators are preferably so developed that they produce a signal train, i.e., a plurality of cycles of sinusoidal signal for each rotor revolution at 3, 4. The rotary generators are further- more so adjusted that for each revolution, they supply the same number of cycles of electrical signal. The sinusoidal analog primary-signal sequence emerging from the rotary generator 3 is converted by a pulse shaper 5 of known type into a pulse train and the latter is fed via the adjustable pulse divider of known construction to the gate-opening connection of a gate circuit 7 of known construction. The sinusoidal analog primary-signal trains emerging from the rotary generator 4 are similarly converted via a pulse shaper 8 of known construction into a pulse train and fed via an adjustable pulse divider 9 of known construction to the gate-closing connection of the gate circuit 7. In addition, sinusoidal analog primary-signal trains taken from the rotary generator 4 are fed via a time-independent signal-dividing pulse generator 10 of known construction, to produce a plurality of secondary pulses from the individual analog primary-signal periods. For this purpose there is preferably used a device in which variations in amplitude of the primary signals do not affect the secondary pulse train; such a device is described, for instance, in German Published Application for Patent (Offenlegungsschrift) 1,945,206.* The secondary pulse train is fed via another adjustable pulse divider 11 of known construction and the gate circuit 7 to an electric pulse counter 12 of known construction. The pulse counter 12 is connected with a storage 13 of known construction, and the latter is in turn connected via a digital-analog converter 14 of known construction to a high-speed recorder 15. Further, the result of the measurement can optionally be obtained in digital form (digit output) at the output 16 and in analog form (voltage) at the output 17. The division ratio of the pulse dividers 6, 9 is so adjusted in known manner that in case of a defect-free gearing, the pulse trains emerging from them have the same frequency, i.e., in the present case the division ratio of the pulse divider 6 is equal to $z_{2/1}$ and that of the pulse divider 9 is equal to $z_{1/1}$, it being recalled that $z_1$ is the number of teeth of gear 1 and $z_2$ is the number of teeth of gear 2. For convenience, and by way of example, individual signal shapes are schematically shown on an enlarged scale at local line connections in the drawing.

*Corresponding to what is now U.S. Pat. No. 3,675,238, issued July 4, 1972.

The manner of operation of the arrangement described above is as follows:

If the gears 1, 2 are free of defects, the rotary generators 3, 4 and pulse shapers 5, 8 supply primary-pulse trains of frequency inversely related to ratio of the number of teeth $z_1$ to $z_2$. After passing through the pulse dividers 6, 9, adjusted in the inverse ratio of the number of teeth, there results equality of frequency of the pulse trains fed to the respective gate-opening and gate closing connections of gate circuit 7. These pulse trains of the same frequency, however, have a constant phase shift with respect to each other depending on the relative output position of the rotary generator systems 3, 4 in the case of defect-free gears 1, 2. If the drive speed should vary, the primary-pulse train frequency will vary in both the driving and driven branches of the system, but the relative phase shift of the two primary-pulse trains will remain constant. On the other hand, if there is an error in transmission of rotation, i.e., a transmission error in the gears, then this will make itself perceptible as a change in the mutual phase positions of the two primary-pulse trains. This change is a direct measure of the rotary transmission error which is to be measured, and for a digital measure of the change, the two pulse trains are used to respectively open and close the electric pulse counter 12.

Each pulse of the driving line, i.e., which leaves the pulse divider 6, opens the gate circuit 7, while the next following pulse of the driven line, i.e., which leaves the pulse divider 9, closes the gate circuit. As long as the gate circuit is open, the higher-frequency secondary-pulse train which comes out of the pulse divider 11 is counted into the pulse counter 12. Since the secondary-pulse trains from the primary-signal trains produced by the rotary generator 4 are produced in the manner described above, they are strictly proportional to the instantaneous angular position of the gear 2, i.e., they represent a true angle measurement; additionally, they are in a mechanically fixed relationship to the control pulses for the gate circuit 7. Thus, the number of secondary pulses counted into the counter 12 is a direct measurement of the relative change in phase position to be measured and of the transmission error which is equivalent thereto. The measurement results which are thus measured in angle units are independent of any drive variations which may occur.

Furthermore, since the pulse spacings of the counted secondary-pulse train can, with the aid of the pulse generator 10, be made considerably smaller, for instance by a factor of 80, than the period lengths of the sinusoidal primary signal trains, the power of discrimination of the measuring device of the invention is better than that of the generator systems used. Thus, for instance, digital measurement steps corresponding to rotational increments of 0.5 seconds of arc can be readily obtained. And, if necessary, the discrimination of the arrangement can be further modified or reduced in very simple fashion by means of the adjustable pulse divider 11 to the extent of a predetermined adjustable factor. It will be understood that the pulse counter 12 may be of the variety which, upon the arrival of the gate-closing pulse, turns its measurement contents over to the storage means 13 and is reset to zero, all as schematically suggested by the dashed synchronizing connections 7'.

For measurement read-out and display, a digital-analog converter 14 supplies to the high-speed recorder 15 a voltage which corresponds to the storage value at 13. It will be understood that, by suitable determination of the size of the measurement step corresponding to the pulse spacing of the secondary-pulse train and the printed graduations on the recorder tape 15a, the result can be obtained, for instance, that a deflection of 1mm on the tape corresponds to a transmission error of one second of arc; this scaled relationship is then determined once and for all, without need for further calibration and without affecting the recorder drive.

The counter 12 will also be understood to be of the variety which, after a predetermined number of steps (number of secondary pulses), automatically resets to zero, such predetermined number of steps being determined by the usable width of the recorder tape 15a. If the measured error in rotation is larger than can be accommodated within this predetermined number of steps, then the recording pen, due to such resetting of the counter, will start to record the plotted diagram further toward the lower edge. On basis of this digital measurement, errors of any size can be detected within predetermined measurement steps. Also, it will be understood that the plotted diagram on the strip 15a of the recorder 15 may be selectively displaced by a brief change of the desired transmission ratio established by adjustment of the individual pulse dividers 6, 9.

Although described in the specific illustrative context of detecting errors in gear transmissions, the invention can, of course, also be used for measurements of errors in rotation and errors in displacement of all types or combinations thereof. For this it is merely necessary to adapt the generator systems 3, 4 to the displacement in the particular use, i.e., for response to rotational or longitudinal displacement in the generation of the signal wave trains.

What is claimed is:

1. The method to detect relative deviations in position of two moving parts which are moved in a predetermined relationship, which method comprises using movement of one of the two parts to generate a first primary-signal train, using movement of the other of the two parts to generate a second primary-signal train, using signals from the first train and from the second train to respectively start and stop a counter, and using movement of said other part to additionally generate secondary pulses (a) at a predetermined higher frequency with respect to that of one of said signal trains, and (b) precisely dependent upon instantaneous position of the said other moving part, said higher-frequency pulses being supplied to said counter as permitted by the start and stop governing action of said first and second signal trains.

2. Method according to claim 1, characterized by the fact that the number of secondary pulses counted into the counter is adjustably variable.

3. Apparatus for detecting relative deviations in position of two movable parts which are moved in a predetermined intended relationship, comprising a first electric generator connected to one of the two parts and responsive to displacement of said one part to generate a first primary-signal train wherein the signal-train period is solely a function of such displacement of said one part, a second electric generator connected to the other of the two parts and responsive to displacement of said one part to generate a second primary-signal wave train having a period that is solely a function of such displacement of said other part, a third electric generator responsive to displacement of said other part and generating pulses of predetermined higher frequency with respect to that of one of said generators, pulse-counter means, and means including a gate connecting said counter means to said third generator for counting the number of the higher-frequency pulses in a given gated interval, said gate including an opening control connection to the output of said first generator and a closing control connection to the output of said second generator.

4. Device according to claim 3, characterized by the fact that said first and second generators are of the variety producing strictly sinusoidally varying signals.

5. Device according to claim 3, characterized by the fact that the pulse generator is so established that it is independent of variations in amplitude of the primary signals fed.

6. Device according to claim 3, characterized by the fact that an adjustable pulse divider is interposed between pulse generator and pulse counter.

7. Device according to claim 3, characterized by the fact that the pulse counter is so developed that it automatically to zero after a predetermined number of steps.

8. Device according to claim 3, characterized by the fact that at least one of the pulse dividers is variable for a short time in its adjustment.

9. Device according to claim 3, further including means for storing the output of said counter means, and read-out means for reading-out the stored value.

10. Device according to claim 9, in which said read-out means includes a moving-chart recorder.

11. Device according to claim 9, in which said read-out means includes a digital-to-analog converter.

* * * * *